United States
Weber

[11] 3,694,076
[45] Sept. 26, 1972

[54] MULTIPLE LENSLET COPIER
[72] Inventor: Paul E. Weber, 921 Bartlet Terrace, Libertyville, Ill. 60048
[22] Filed: Aug. 31, 1970
[21] Appl. No.: 68,212

[52] U.S. Cl. ..................355/50, 95/15, 350/190, 350/213, 355/51
[51] Int. Cl. .................G03b 27/48, G03b 27/50
[58] Field of Search ......355/50, 51, 8, 46, 54; 95/15; 350/190, 213

[56] References Cited

UNITED STATES PATENTS

| | | | |
|---|---|---|---|
| 2,736,235 | 2/1956 | Toulon | 350/190 |
| 3,409,354 | 11/1968 | Frank | 350/213 UX |
| 3,447,438 | 6/1969 | Kaufer et al. | 95/15 |
| 3,241,438 | 3/1966 | Frank | 355/50 |
| 3,264,933 | 8/1966 | Frank | 355/50 |

FOREIGN PATENTS OR APPLICATIONS

| | | | |
|---|---|---|---|
| 1,298,407 | 6/1969 | Germany | 355/50 |
| 1,453,771 | 8/1966 | France | 355/50 |
| 152,068 | 1/1935 | Austria | 355/51 |

Primary Examiner—Samuel S. Matthews
Assistant Examiner—Richard A. Wintercorn
Attorney—Griffin, Branigan and Kindness and Jack H. Hall

[57] ABSTRACT

This disclosure describes a multiple lenslet copier wherein a plurality of pairs of lenslets are aligned along a common axis. Each pair of lenslets include a first and a second lenslet separated by an air space. The air space forms a field lens that images light rays from the outer surface of the first lenslet onto the outer surface of the second lenslet to reduce vignetting. An optical field stop is located in the air space between the lenslets to limit the size of the image projected by each pair of lenslets. In addition, a baffle is located along the optical axis of each pair of lenslets to prevent cross-talk. The pairs of lenslet are moved at right angles to their common axis across the surface of an original document so as to project an image onto a sheet of copy paper. The copy paper is either moved to a stationary position prior to movement of the pairs of lenslets or moved as the pairs of lenslets are moved. Alternatively, the copy paper and the original document may move while the pairs of lenslets remain stationary.

46 Claims, 15 Drawing Figures

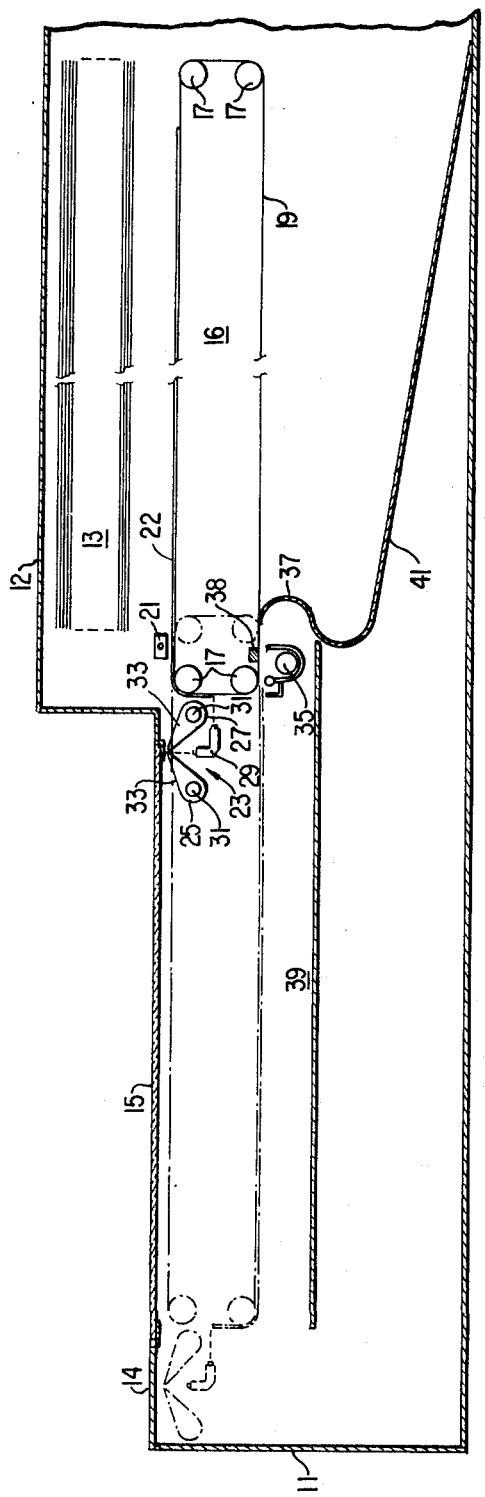
FIG. 1
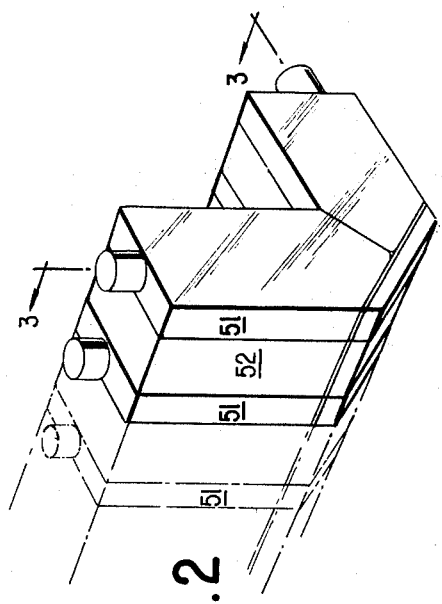
FIG. 2
FIG. 3
INVENTOR
PAUL E. WEBER
BY Griffin, Branigan & Kindness
ATTORNEYS

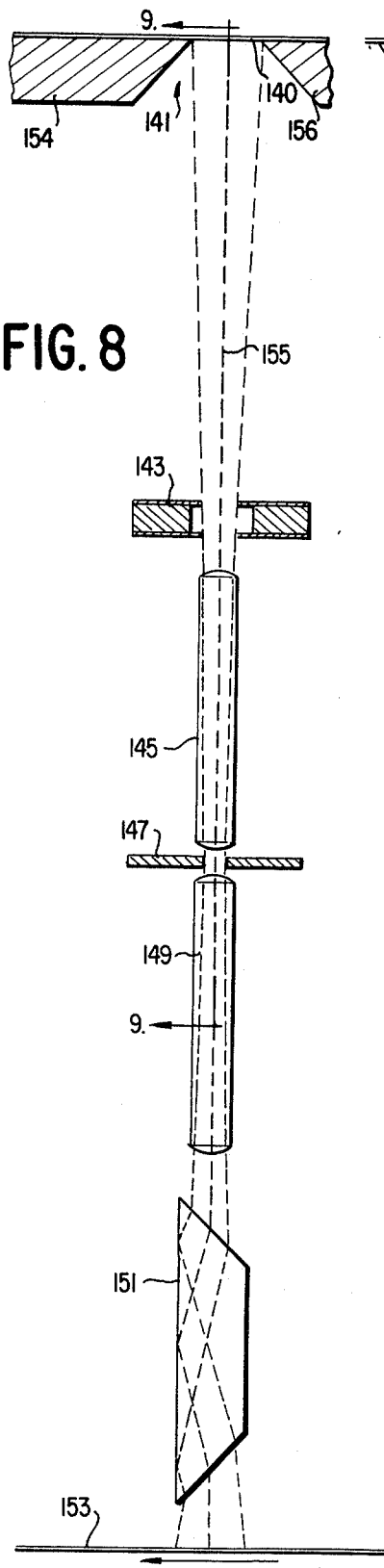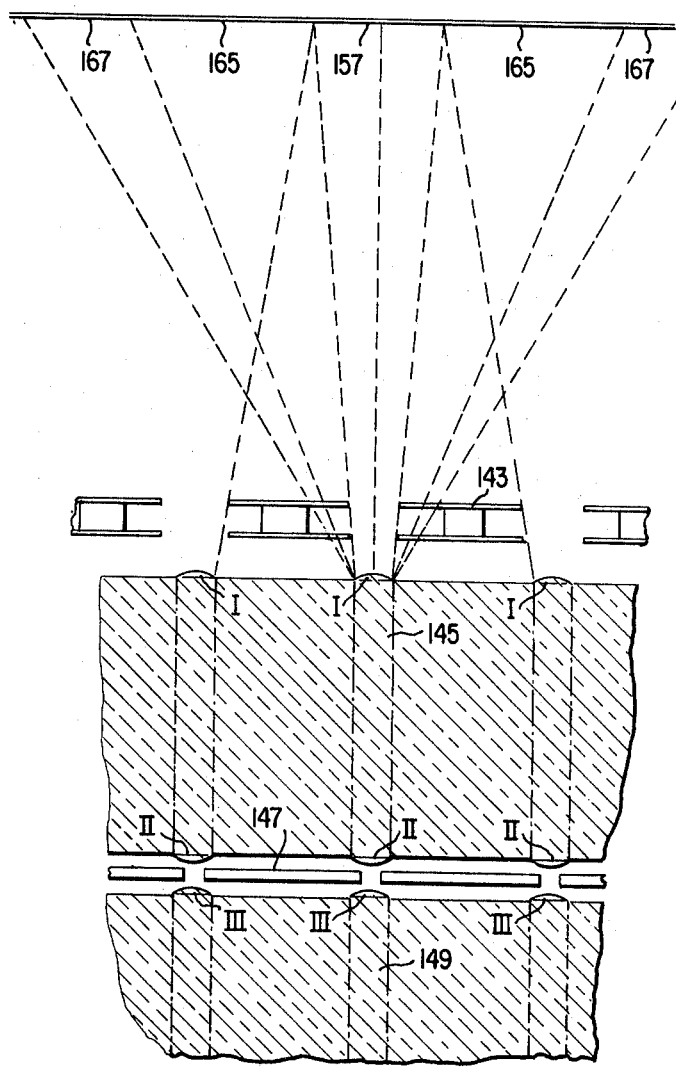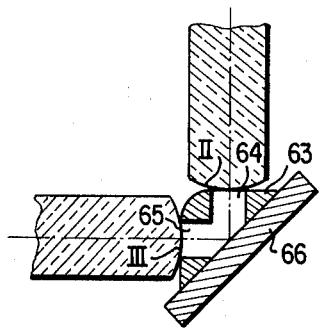

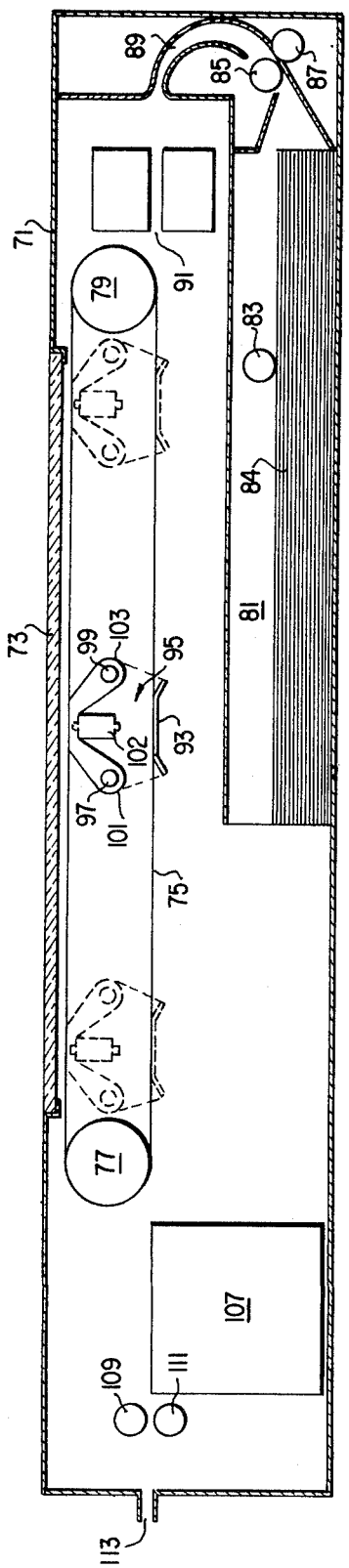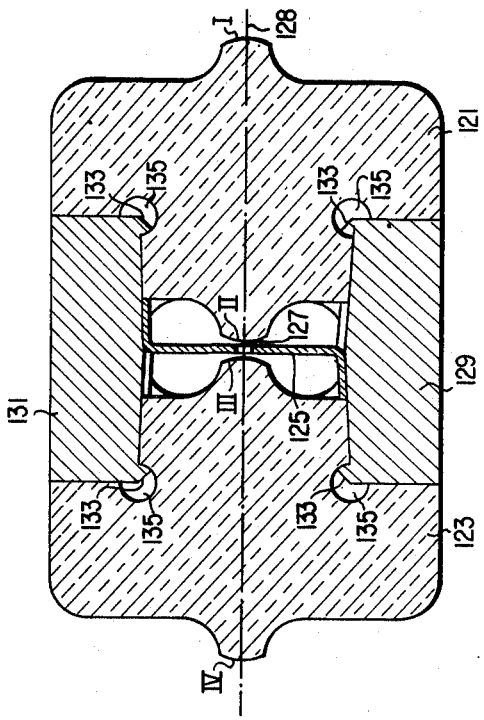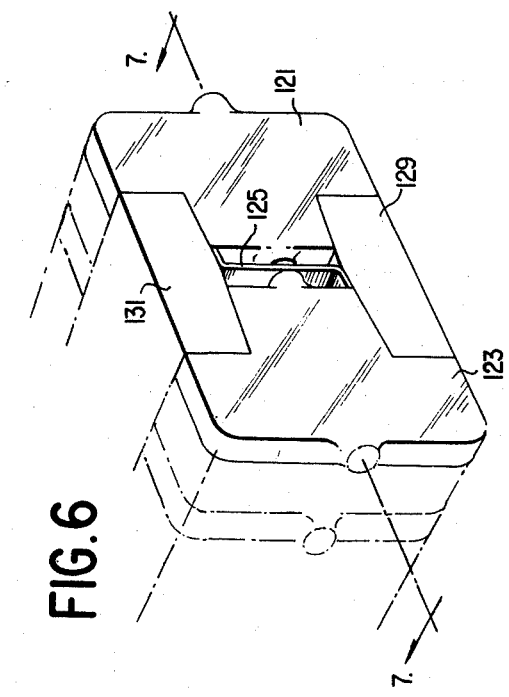
FIG.5
FIG.7
FIG.6
INVENTOR
PAUL E. WEBER
BY Griffin, Branigan & Kindness
ATTORNEYS

INVENTOR
PAUL E. WEBER

BY Griffin, Branigan & Kindness

ATTORNEYS

MULTIPLE LENSLET COPIER

BACKGROUND OF THE INVENTION

This invention is directed to copiers and more particularly to document copiers of the type having an optical objective for projecting an imagine of an original document onto a sheet of copy paper.

Various types of document copiers are well known and widely used. They vary from simple "wet process" copiers to complex multiple copy electrostatic copiers. In many such copiers an optical objective is used to imagine either the entire original document or a small strip of the original document onto a sheet of copy paper. In the latter case the original document is moved with respect to the image slit in order to provide a copy of the entire original document, or the slit is moved with respect to the original document.

One major disadvantage of copiers of the foregoing nature is their requirement for a relatively long tracklength (the distance between the original and the copy). Previously a long tracklength has been necessary in order to reduce the size of the field of view angle covered by the imaging objective to a reasonable value. That is, a shorter tracklength requires a larger view angle and vice versa. While the field of view angle can be increased by increasing the number of lens elements in the lens objective, such an approach also increases the cost of the objective. In addition, because of the shorter tracklength, the focal length of the lenses must also be shorter which adds to the cost of the lenses making up the objective. Moreover, if the F number (exposure time) is maintained constant, the decrease in lens diameter does not contribute to an appreciable cost decrease because a smaller focal length ($f$) is needed. Further, if the focal length becomes too small (less than one-quarter inches) then the cost of the lenses starts to rise again because the required tolerances become more stringent. It is for these reasons that prior art tracklengths are normally in the range of 18 to 30 inches. This allows prior art objectives to be formed of only three or four lens elements.

From the foregoing discussion, it will be appreciated that the main reasons prior art copiers have been expensive to manufacture are the complexity and expense of their lens system. The same reason has dictated that prior art copiers be relatively bulky in size.

Therefore, it is an object of this invention to provide a new and improved lens system suitable for use in a copier.

It is another object of this invention to provide a lens system suitable for use in a copier that is relatively uncomplicated yet does not require a large tracklength in order to project a document image onto a copy sheet.

It is a further object of this invention to provide a copier including a lens system that does not require a long tracklength.

It is yet another object of this invention to provide a new and improved copier that has a relatively low profile.

It is a still further object of this invention to provide a new and improved copier that utilizes a lens objective that does not have a long tracklength whereby a rather low silhouette copier is provided.

SUMMARY OF THE INVENTION

In accordance with principles of this invention, a multiple lenslet copier is provided. The copier includes a novel objective comprising a plurality of pairs of lenslets aligned along a common axis. Each pair of lenslets includes a first lenslet and a second lenslet separated by an air space. The air space separation is very small whereby the air space acts as a field lens and images light rays from the outer surface of one lenslet onto the outer surface of the other lenslet to reduce vignetting. An optical field stop is located in each air space to limit the size of the image projected by each pair of lenslet. Preferably, a baffle is also located along each of the optical axes defined by the pairs of lenslets so as to eliminate optical cross-talk.

In accordance with further principles of this invention, the copier includes a means for moving the multiple lenslet objective across the surface of an original document so as to project an image onto a sheet of copy paper. In one embodiment, the copy paper is moved to a stationary position prior to movement of the objective. In an alternate embodiment, both the copy paper and the objective are moved with the copy paper moving twice as fast as the objective. In still further embodiments, the optical objective remains stationary and the original document and the copy paper move.

In accordance with still further principles of this invention, the multiple lenslet copier is an electrostatic process copier wherein the copy paper is charged prior to the projection of an image onto its surface by the optical objective. And, after the document image has been projected onto the electrostatic surface, the electrostatic surface is developed.

It will be appreciated by those skilled in the art and others that this invention provides a new and improved copier that uses a novel multiple lenslet objective. The novel objective greatly reduces focal length and individual field of view, yet does not limit the overall field of view to the point where a large number of components are required. Further, lenslets of the type required by the invention can be formed in a single casting arrangement from plastic, whereby the cost of the overall objective is made exceedingly small compared with prior art objectives. Moreover, because tracklength is greatly reduced, the size and silhouette of a copier formed in accordance with the invention are decreased.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 1 is a cross-sectional view of a copier formed in accordance with the invention;

FIG. 2 is a perspective view of a multiple lenslet objective formed in accordance with the invention suitable for use in the copier illustrated in FIG. 1;

FIG. 3 is a cross section view along line 3—3 of FIG. 2;

FIG. 4 is a cross-sectional view of a portion of an alternate embodiment of a multiple lenslet objective suitable for use in the embodiment of the invention illustrated in FIG. 1;

FIG. 5 is a cross-sectional view of an alternate embodiment of a copier formed in accordance with the invention;

FIG. 6 is a perspective view of a multiple lenslet objective formed in accordance with the invention suitable for use in a copier of the type illustrated in FIG. 5;

FIG. 7 is a cross-sectional view along line 7—7 of FIG. 6;

FIG. 8 is a schematic view illustrating in greater detail the optical components forming one embodiment of a multiple lenslet objective;

FIG. 9 is a schematic view illustrating the use of a baffle to prevent optical cross-talk; and, FIGS. 10A-F are schematic views illustrating various optical copying arrangements utilizing a multiple lenslet objective formed in accordance with the invention.

DESCRIPTION OF THE PREFERRED EMBODIMENTS

Figure 10A:
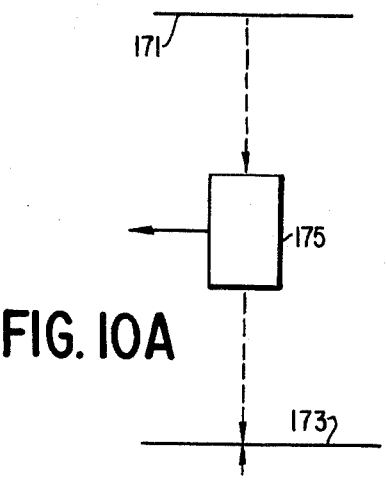

The following description of the preferred embodiments of the invention describes novel electrostatic copier structures that include a novel multiple lenslet imaging objective formed in accordance with the invention. However, it is to be understood that multiple lenslet imaging objectives of the type described can be utilized in other types of imaging copier systems.

FIG. 1 illustrates an electrostatic copier formed in accordance with the invention and comprises a housing 11 having a stepped upper portion 12. The raised or stepped upper portion 12 of the housing 11 encloses a copy paper storage region 13. The lower portion 14 of the upper surface encloses a glass plate 15. The document to be copied is placed face down on the upper surface of the glass plate 15. It will be appreciated that the document can either be a page from a book or a single document.

Also illustrated in FIG. 1 is a copy paper moving system 16 comprising four rollers 17 mounted in a generally rectangular cross-sectional configuration and a belt 19, preferably formed and, of Mylar. The rollers 17 support the belt 19. As illustrated in FIG. 1, the Mylar belt is located beneath the copy paper storage area 13. Because of this structural arrangement, the sheets of copy paper can be individually dropped into the Mylar belt by gravity or by any other suitable means, as desired.

Located above the Mylar belt 19 adjacent to the end of the copy paper nearest the glass plate is a charging unit 21. In a well known manner, the charging unit 21 applies an electrostatic charge to a sheet of copy paper 22 as the Mylar belt moves the sheet beneath the charging unit due to the revolution of the rollers 17.

Located to the left of the Mylar belt 19, immediately adjacent to the closest edge of the glass plate 15, is an imaging system 23. The imaging system 23 includes first and second illumination systems 25 and 27 located on either side of a multiple lenslet imaging objective 29 of the type best illustrated in FIGS. 2 and 3, or 4, and hereinafter described. Each illumination system 25 and 27 comprises an illumination tube 31 and a light directing housing 33. Each illumination tube, which can be a tubular incandescent bulb, for example, extends the width of the glass plate 15 at right angles to the cross section illustrated in FIG. 1. The light directing housings 33 are generally U-shaped in cross section and are mounted about the illumination tubes 31 so as to direct light along a line or slit on the face of a document that has been placed face down on the glass plate 15.

The multiple lenslet objective 29 is a right angle objective and images the line or slit portion of the document illuminated by the illumination systems 25 and 27 onto a line or slit area on the Mylar belt 19 between the end pulleys. By means not shown, the imaging system 23 is fixedly attached to the Mylar belt 19 and the pulleys 17.

Turning now to a description of the operation of the above described copier, a single sheet 22 of copy paper from the copy paper storage 13 is dropped onto the upper surface of the Mylar belt 19. Electrostatic attraction or mechanical clamps (not shown) adheres the copy paper to the Mylar belt. At this time the pulleys 17 remain stationary with respect to the housing 11 but rotate to move the Mylar belt so that the front portion of the sheet 22 of copy paper is moved beneath the charging unit 21 and is charged. Movement of the copy paper continues until the front edge of the copy paper intersects a line image of the leading edge of the glass plate 15 and the document being projected by the multiple lenslet imaging objective 29. When this occurs a clamp 38 that is affixed to the housing 11 is activated (by means not shown) to prevent further movement of the copy paper caused by the pulleys moving the Mylar belt while remaining stationary. The clamp may be activated by photocell operated relays, for example. Thereafter, the entire imaging system 23 and the copy paper moving system 16 move to the left as viewed in FIG. 1.

As this entire structure moves to the left, the pulleys 17 again move the Mylar belt and the sheet 22 of copy paper so that the multiple lenslet imaging objective 29 sees succeeding portions of the original document as it images onto succeeding portions of the sheet of copy paper, in synchronism. This action continues until the multiple lenslet imaging objective 29 has viewed the entire original document and reached the end of its path of travel. This location is indicated by the dashed lines in FIG. 1. At this point, the sheet of copy paper has reached the end of its "copy" path of travel. It should be noted that while the Mylar belt 19 and the sheet of copy paper 22 have moved with respect to the pully 17, the leading edge of the sheet of copy paper has remained stationary with respect to the housing because the clamp 38 is affixed to the housing 11. This arrangement provides self-synchronization between the movement of the sheet of copy paper 22 and the movement of the imaging system 23, i.e., they each move the same distance at the same rate.

It can be seen from FIG. 1 that the Mylar belt has moved the leading edge of the sheet of copy paper through a developing unit which develops the image on the copy paper. Immediately after passing through the developing unit 35, the edge of the copy paper intersects a "strip-off" means 37. The strip-off means 37 strips the copy paper off the Mylar belt and moves it into a reversing area 39. Hence, on the return stroke of the copy paper moving system 16, the sheet of copy paper is developed, stripped off and moved to the reversing area. Thereafter, when the entire copy has been stripped off, it is removed from the reversing area to an exit slide 41, by means not shown. The removal means could be a belt driven by pulleys, gravity or any other suitable means.

Turning now to a description of the multiple lenslet imaging objective illustrated in FIGS. 2 and 3; the multiple lenslet imaging objective comprises a plurality of pairs of lenslets 51 arrayed along a common longitudinal axis. A cross-sectional view of a single pair of lenslets 51 along line 3—3 of FIG. 2 is illustrated in FIG. 3. Each pair of lenslets is formed of a doublet of similar plastic lenslets 53 and 55 mounted at right angles (90°) and separated by a narrow air gap 57 wherein an optical field stop 59 is located. Preferably, the optical field stop 59 has a square aperture that covers an area of about 16 mm$^2$. In addition, a mirror surface 61, formed on a backing plate 62, is located in the aperture of the optical field stop 59 to re-direct the projected image from one lenslet 53 through the second lenslet 55.

Each lenslet 53 or 55 has first and second spherical optical surfaces designated I and II for the first or upper lenslet 53, and III and IV for the second or lower lenslet 55. The surfaces are all located along a common right angle axis 56. As illustrated in FIGS. 2 and 3, the first and last spherical surface (I and IV) are undercut along the length of the objective so that only the necessary curvature is exposed. The undercut regions aid in supporting the overall objective. Further, the other ends of the lenslet structures are generally triangular shaped in cross section. The second and third spherical surfaces (II and III) are located at the apex of the triangles along the optical axes 56. Because the desired lens curvature exist at the apexes a desired air gap is formed. The optical field stop 59 is located in the air gap. In essence, the air gap and optical surfaces II and III form field lens that images rays from surface I to surface IV. The outside sides of the apex's form a surface whereon the mirror 61 is mounted. While the lenslet sections 51 are illustrated in FIG. 2 as separated by regions 52, they can be arranged side by side, if desired. However, a separation, between optical axes by a distance of up to three times the size of a single lenslet, is preferred because the cost of lenslet formation is reduced without suffering a high light loss. In addition, preferably, the lenslets have the following characteristics:

| Surface | R | d' | n' |
|---|---|---|---|
| I | 4.00 | | |
| | | 15.26 | 1.489 |
| II | −7.54 | | |
| | | 1.28 | 1.0 |
| III | 7.54 | | |
| | | 15.26 | 1.489 |
| IV | −4.00 | | | where:
R = radius of curvature in mm;
d' = apex separation in mm; and,
n' = index of refraction of material between surfaces.

Furthermore, preferably, the overall multiple lenslet optical objective has the following general characteristics:
F - number = 8.47
Focal length = 9.45 mm
Object distance = 29.66 mm
Image distance = 29.66 mm
Tracklength = 91.12 mm A multiple lenslet optical objective of the foregoing nature has a resolution capability of better than 10 Lp/mm. The first lenslet 53 (the one adjacent to the document) creates a primary 180° rotated image 2.82 times reduced. The second lenslet 55 recreates an image of the original size again 180° rotated. Because the plurality of pairs of lenslets are located along adjacent parallel optical axes, multiple images are formed which are assembled to form a total image of the original document without any field curvature in a flat image plane.

FIG. 4 illustrates a slightly different optical field stop arrangement that includes an optical field stop 63 that is right triangular shaped in cross section. Two square shaped apertures 64 and 65 pass at right angles through the field stop, one from each side. The square shaped apertures intersect at the hypotenuse where a slightly larger aperture is formed. A mirror 66 lies along the hypotenuse to redirect incoming rays from one square-shaped aperture 64 out the other square-shaped aperture 65. Surfaces II and III of the lenslets are adjacent to the outer edges of the square shaped apertures 64 and 65, respectively. Rays from the original document thus pass through surface II and its associated square-shaped aperture 64 and impinge on the mirror 66. The mirror 66 redirects the rays 90° so that they pass through the other square-shaped aperture 65 and its associated surface III.

It will be appreciated by those skilled in the art that the curvatures of the first and last surfaces (I and IV) are primarily responsible for image creation while the second and third surfaces (II and III) act mainly as a field lenslet that images the first surface to the fourth surface to reduce vignetting. More specifically, surfaces II and III in combination with the narrow air gap act as a field lens. While the surfaces of this field lens are bi-concave, they act as a bi-convex lens because of the index of refraction of air. Because the gap is very small, the image plane for both lens surfaces is essentially the same plane whereby surfaces II and III have very little or no effect on the clarity of the image they relay from surface I to surface IV. Consequently, a doublet formed of two lenslets separated by a narrow gap accomplishes what has previously been done with a triplet formed of three bi-convex lenses as described in U.S. Pat. No. 3,447,438 to Kaufer et al., for example. That is, the optimum quality embodiment described in that patent includes a pair of lenslets separated by an air gap with a field lens located in the air gap.

The optical field stop 59 or 63 located between the second and third surfaces permits only the passage of a reduced image of the proper size. Rays coming in from the area outside of the area to be imaged by each lenslet are partially rejected by the optical field stop (as will be better understood from the following description a baffle is provided to reject other unwanted rays).

It will be appreciated from the foregoing description that the invention provides an uncomplicated electrostatic copier that includes a novel imaging lens system. As indicated, the tracklength of the lens system is short. In addition, if desired, all of the lenslets of the multiple lenslet objective may be simultaneously formed in a single plastic die. Hence, not only is the tracklength of the invention greatly reduced over prior art copiers but the cost of producing the optical objective is also greatly reduced.

FIG. 5 is a cross-sectional view of an alternate embodiment of an electrostatic copier formed in accordance with the invention that utilizes a slightly different configuration of the novel multiple lenslet imaging objective. The imaging objective utilized in FIG. 5 is illustrated in FIGS. 6 and 7 and hereinafter described.

The electrostatic copier illustrated in FIG. 5 comprises a housing 71 having a document supporting glass plate 73 mounted in its upper surface. A transparent belt 75 having pulleys 77 and 79 located on either end lies immediately beneath the glass plate 73. Preferably, the transparent belt 75 is formed of Mylar. Located at the bottom left side of the housing 71 is a copy paper storage area 81. A paper feed roller 83 rests on top of a stack of sheets of copy paper 84 located in the copy paper storage area 81 and feeds single sheets of copy paper from the top of the stack out the right side of the copy paper storage area 81, as viewed in FIG. 5.

Each single sheet of copy paper, fed from the copy paper storage area 81 by the paper feed roller 83, is picked up by a pair of pick-up rollers 85 and 87 located on the right side of the copy paper storage area 81. The pick-up rollers 85 and 87 feed the sheet of copy paper along a curved track 89. The curved track is formed such that, when the sheet of copy paper exists at the upper end of the track, it is parallel to the remaining sheets of copy paper stacked in the copy paper storage area 81, and inverted.

Each sheet of copy paper passes through an electrostatic charging area 91 where it is electrostatically charged as it exits from the curved track 89. The thusly charged sheet of copy paper is picked up by the Mylar belt 75. The electrostatic charge makes the sheet adhere to the belt. The belt moves the sheet of copy paper until it is parallel to and beneath the glass plate 73. It should be noted that photo copy surface of the sheet of copy paper is now facing away from the Mylar belt.

A pressure plate 93 is located beneath the copy paper in line with an imaging system 95. The imaging system includes an illumination system and a multiple lenslet optical objective 102. As with FIG. 1, the illumination system comprises a pair of illumination tubes 97 and 99 located on either side of the multiple lenslet optical objective 102. The tubes are housed in a pair of light directing housings 101 and 103, respectively. The light directing housings 101 and 103 direct the light from the light tubes 97 and 99, along a line or slit across the surface of a document placed on the glass plate 73. The portion of the document thus illuminated is projected, by a multiple lenslet imaging objective 102 of the type illustrated in FIGS. 6 and 7 and hereinafter described, through both Mylar belts to the backside of the sheet of copy paper. Because of the relatively high intensity of the light, the image also reaches the photo sensitive surface of the copy paper.

The pressure plate 93, and the imaging system move from the right to left as viewed in FIG. 5 after a sheet of copy paper has been placed on the lower surface of the Mylar belt in the manner previously described. This movement creates a composite image on the light sensitive surface of the sheet of copy paper. The composite image is a right reading image of the original document and not a mirror image because the sheet of copy paper is inverted. After the pressure plate 93 and the imaging system 95 have covered their entire path of travel and lie at the left end of the glass plate, the Mylar belt again revolves and moves the sheet of copy paper through a developing area 107. After movement through the developing area, the sheet of copy paper is picked up by a pair of ejection rollers 109 and 111 and ejected from the electrostatic copier through an opening 113.

As with FIG. 1, the novel multiple lenslet imaging objective utilized by the embodiment of the invention illustrated in FIG. 5 reduces the tracklength over prior art systems. In order to reduce the tracklength, multiple short focal length lenses of, for example, $f = 9.45$ mm, are used. Each lenslet covers only a small total field of view angle, such as $2\alpha = 9°00'$, for example or an area of only $4 \times 4$ mm square. As illustrated in FIGS. 6 and 7 each pair of lenslets consists of two lenslets, 121 and 123. Each of the two lenslets has the same dimensions and the same index of refraction. Preferably, the lenslets are formed of an acrylic plastic which allows them to be made inexpensively in large quantities.

It will be appreciated by those skilled in the art that it is the use of this novel objective that reduces the dimensions of the overall copier. It will also be appreciated that the use of the slit image copier principle allows the original to be illuminated properly even though there is only a very small distance between the original and the front surface of the adjacent lenslet. Moreover, in order to make copies from books, the optical system rather than the original and the copy paper are moved in this embodiment. However, as will be better understood from the following description of FIGS. 10A–F the original document can be moved, if desired. Hence, the invention is not only uncomplicated but is also versatile.

As with the optical systems illustrated in FIGS. 2, 3 and 4, the optical system illustrated in FIGS. 6 and 7 utilizes the curvatures of the first and last spherical surfaces (I and IV) of each lenslet for image creation. The second and third spherical surfaces (II and III) act together with the air gap as a field lens that images the first surface I onto the last surface IV to reduce vignetting and loss of light. A mask or optical field stop 125 with square holes 127 is located between the second and third spherical surfaces to permit only a reduced image of the proper size to pass through each lenslet configuration. Rays coming from outside of the area to be imaged by each pair of lenslets are rejected. It will be appreciated that in order to obtain a right reading copy image whereby all of the little images add up to the total image to be copied, it is necessary to use a double imaging system whereby the total magnification remains 1:1. To create this situation, the first lens creates a primary 180° rotated image which is, preferably, 2.82 times reduced. The second lens recreates an image of the original size again 180° rotated.

It will also be appreciated that in order to obtain a readable copy from a system wherein the photoconductive layer of the copy paper faces down, a longer exposure time is necessary because of the additional light loss in the backing paper. While a slight decrease in resolution is thus created, such decrease can be tolerated because the resolution of the herein described lenslets is about twice the resolution necessary for an operative embodiment of the invention.

Preferably, lenslets utilized in the embodiment of the invention illustrated in FIG. 5 have the values set forth in the foregoing table.

FIGS. 6 and 7 illustrate pairs of lenslets suitable for use in the FIG. 5 embodiment greatly enlarged for ease of viewing. Because of the smallness of each lenslet, they are created in the center of a structure having a large amount of excess plastic to enable secure mounting. More specifically, each lenslet 121 and 123 illustrated in FIG. 7 is generally T-shaped in cross section, and has spherical lens surfaces projecting outwardly from the top and bottom of the T. One lenslet is upright and the other is inverted so that all optical surfaces (I, II, III and IV) are centrally aligned along a common axis 128.

The mask 125 is generally Z-shaped and is located between the T-shaped lenslets for easy retention in place. Preferably, the Z-shaped mask runs the entire length of the optical objective and provides a square optical field stop 127 between each pair of lenslets. In addition, right and left bands 129 and 131 are located between the T's in order to hold the entire structure in a fixed relationship. More specifically, the bands have tips 133 at their inner corners that project into semicircular holes 135 formed between the arms and the legs of the T's. Because the two parts are absolutely identical, they can be snapped and locked together by such an arrangement while maintaining the mask between the structures in the air space therein formed. In order to avoid any side movements in this alignment, the Z-shaped mask, is preferably, divided into four Z-shaped sections whereby the right and left portions of this configuration are exchanged along the length of the overall structure. If the optical objective includes 70 pairs of lenslets, the entire objective is a stripe approximately 280 mm long, 30 mm high and 20 mm wide.

Using an optical objective of the foregoing nature and assuming a tolerable irradiance energy level $H_o \cdot t$ of not more than 2.4 watt sec/cm$^2$, a light/radiation ratio $\eta$ of 20 Lm/Watt for a tungsten-halogen lamp, an illuminance energy level $E_p \cdot t$ of 0.04 Lm-sec/cm$^2$ and a light gathering factor $k$ of 0.001, the following calculations can be made for the actual $H_o \cdot t$:

$$H_o \cdot t = E_p \cdot t / k \cdot \eta$$
$$= 0.04/0.001 \cdot 20$$
$$= 0.04/0.02$$
$$= 2 \text{ watt sec/cm}^2$$

Since 2 watt sec/cm$^2$ is less than 2.4 watt sec/cm$^2$, this irradiance energy level is tolerable.

Since there can be practically expected irradiance power level at the original of not more than $E_o = 1,000$ Lm/cm$^2$, assuming a slit width $\Delta s$ of 4 mm, the instantaneous exposure time $\Delta t$ must not be shorter than:

$$\Delta t > E_p \cdot t / E_o \cdot k$$
$$> 0.04/1,000 \cdot 0.001$$
$$> 0.04 \text{ sec.}$$

Since the total travel length for a normal document is S = 11 inches = 280 mm, the total exposure time $t$ when $\Delta s = 4$ mm is:

$$t > (S \cdot \Delta t / \Delta S)$$
$$> 280 \cdot 0.04/4$$
$$> 2.8 \text{ sec}$$

The actual exposure time necessary for the operation of the invention is, therefore, not more than $t = 3$ seconds. The total source power (P) necessary can be expected to be less than 1,000 watts since $P = 1.75 \cdot H_o \cdot t \cdot S \cdot \Delta S / 100 \Delta t = 980$ watts.

FIG. 8 is a schematic diagram illustrating an alternate embodiment of a novel multiple lenslet imaging objective formed in accordance with the invention. More specifically, FIG. 8 comprises: an original document 140; a slit 141; a baffle 143; a first lenslet 145; an optical field stop 147; a second lenslet 149; a Dove prism 151; and, a sheet of copy paper 153. All of the foregoing elements are aligned in the designated manner along an optical axis 155. As previously described, the slit 141 is defined by elements 154 and 156 which may form a part of the illumination system. Preferably, the slit lies beneath a plate of plastic or glass (not shown) upon which the original document 140 resides, the document facing downward. The image of the original document 140 located in the slit 141 passes through an opening in the baffle 143. This image continues through the first lenslet 145 and the aperture in the optical field stop 147 to the second lenslet 149. The image passes through the second lenslet 149 and the Dove prism 151 to impinge on the copy paper 153.

While a baffle is not illustrated in the previously described embodiments, its inclusion is preferred in those embodiments as well as in the FIG. 8 embodiment. Its inclusion is preferred because it prevents unwanted rays originating at the original document from impinging on the copy paper. More specifically, as illustrated in FIG. 9, which is a partial view that is at right angles to the plane of view of FIG. 8 along line 9—9, light rays from the field of view area 157 of the original document pass through the centrally illustrated first lenslet 145 and the aperture in the optical field stop 147, and proceed into the second lenslet 149. Thereafter, these rays impinge on a sheet of copy paper. While the optical field stop 147 will remove rays from the areas referred to be reference numerals 165, light from the areas referred to by reference numerals 167 will pass through the aperture in the optical field stop 147 and impinge on the sheet of copy paper, in the absence of a further optical stop. These rays will, of course, deteriorate the copy image. However, as illustrated in FIG. 9, the baffle 143 rejects these undesired rays. While FIGS. 8 and 9 illustrate the baffle as being located between the original document and surface I of the lenslet structure, alternatively, it could be located between the copy paper and surface IV of the lenslet structure.

The Dove prism 151 is used in the FIG. 8 embodiment of the invention to eliminate the necessity of copying through the back of the copy paper as previously described with respect to FIG. 5. That is, as previously described, the FIG. 5 embodiment encompasses a back thru imaging technique. By including a dove prism either between surface IV and the sheet of copy paper, as illustrated in FIG. 8, or between the original and surface I of the multiple lenslet structure, the image is reversed prior to impinging on the sheet of copy paper. Hence, the sheet of copy paper can face the original document whereby less illumination of the original document is required. In other words, the Dove prism reverses the image so that it is right reading on the surface of the copy paper without requiring that the image pass through the back of the copy paper. In general, a similar function is provided by the mirror surface of the lenslet structure utilized in the embodiment of the invention illustrated in FIG. 1 and previously described, i.e., the mirror reverses the image so that it does not have to pass through the back of the sheet of copy paper.

Figure 10B:
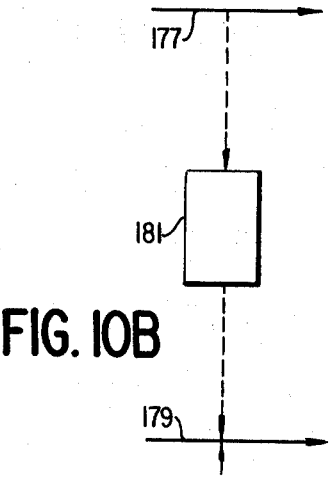

FIGS. 10A–F are schematic diagrams illustrating many of the ways a copier can be made using the optical objective of the invention. One of these ways (FIG. 10A) has been previously described. FIG. 10A illustrates a copier wherein an original document 171 and a sheet of copy paper 173 are both stationary. The copy paper lies in a plane that is parallel to the plane in which the original document lies. An optical objective 175 moves between the original document 171 and the sheet of copy paper 173. Imaging is performed through the back of the copy paper. Hence in essence, FIG. 10A illustrates schematically the embodiment of the invention illustrated in FIG. 5 and previously described. FIG. 10B illustrates the opposite structure. More specifically, the embodiment illustrated in FIG. 10B includes an original document 177 and a copy document 179 that are moved in the same direction and at the same speed in planes that are in parallel and on either side of an optical objective 181 which remains fixed. Again, imaging is through the back of the sheet of copy paper.

Figure 10C:
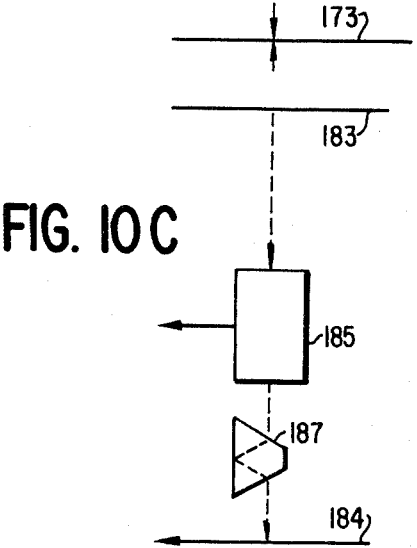
Figure 10D:
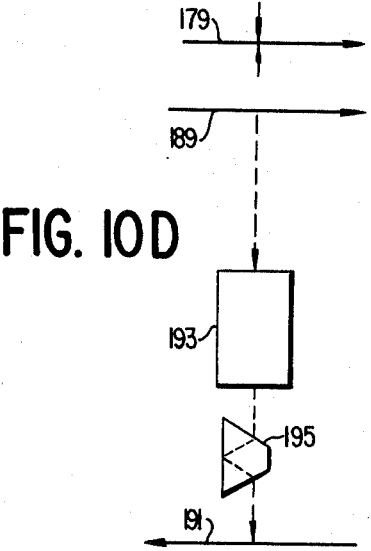

FIG. 10C illustrates schematically a still further copier structure wherein an original document 183 remains fixed. A sheet of copy paper 184 is movable with respect to the original document 183 in a plane parallel to the original document. An imaging objective 185 and a Dove prism 187 are located between the original document 183 and the sheet of copy paper 184 and move in the same direction as the direction of movement of the sheet of copy paper 184. Because both the sheet of copy paper 184, the imaging objective 185 and the Dove prism 187 move in the same direction, the sheet of copy paper must move at twice the speed of the speed of movement of the imaging objective and the dove prism. FIG. 10D illustrates an embodiment that includes a moving original document 189 and a moving sheet of copy paper 191 disposed in parallel planes plus a fixed imaging objective 193 and a fixed Dove prism 195 located between the sheet of copy paper and the original document. As illustrated by the arrows in FIG. 10D, the original document 189 and the sheet of copy paper 191 move in opposite directions.

It should be noted that FIGS. 10A and 10B illustrate schematically structures wherein the original document is imaged through the back of the sheet of copy paper and FIGS. 10C and 10D illustrate schematically structures wherein the original document is imaged directly onto the front of the sheet of copy paper. It should also be noted that a Dove prism could be included in the FIG. 10A and 10B embodiments to provide front surface imaging, if desired. And, vice versa, the Dove prism could be eliminated from the FIG. 10C and 10D embodiments so that reverse or "back-thru" imaging occurs. In addition, it should be noted that the Dove prism can be shifted from its illustrated location between the sheet of copy paper and the imaging objective to a location between the original document and the imaging objective in all of these structures. Moreover, while not shown, the use of a baffle is preferred in these as well as the other embodiments of the invention herein described.

Figure 10E:
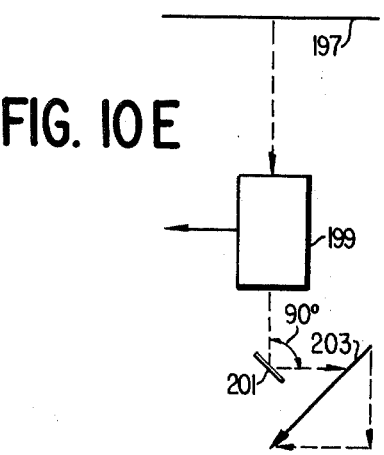
Figure 10F:
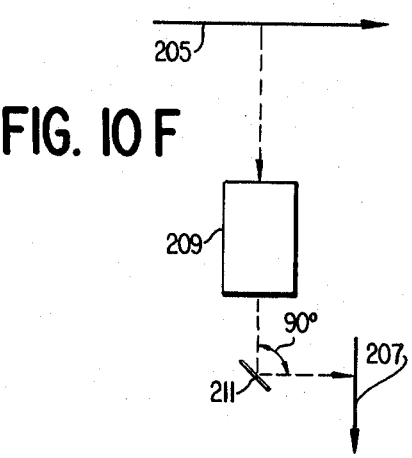

FIG. 10E illustrates a copier wherein an original document 197 is fixed during copying and is imaged by a moving imaging objective 199. The light rays passing through the imaging objective 199 impinge on a mirror 201. The mirror 201 redirects the rays onto a sheet of copy paper 203. The sheet of copy paper is illustrated in FIG. 10E as moving at an obtuse angle with respect to the redirected light rays. However, if desired, this obtuse angle could be 90° whereby a system of the general type illustrated in FIG. 1 is formed. It should also be noted that the 90° redirecting of the light rays by the mirror 201 illustrated in FIG. 10E is not absolute. This angle can lie between 60° and 120° for practical purposes. FIG. 10F is generally similar to FIG. 10E except that the original document 205 and the sheet of copy paper 207 move while the imaging objective 209 remains stationary. However, as with the FIG. 10F embodiment, the image from the original document 205 passes through the imaging objective 209 and is reflected by the mirror 211 onto the face of the moving sheet of copy paper 207.

It should be noted that FIGS. 10A–F only illustrate schematically some of the various relationships that can be formed using the invention. In general, FIGS. 10A and 10B illustrate straight copying through the back of a sheet of copy paper, FIGS. 10C and 10D illustrate straight copying onto the face of a sheet of copy paper, and FIGS. 10E and F illustrate right angle copying onto the face of a sheet of copy paper. However, as partially described above, various changes can be made in any of these structural arrangements whereby yet different embodiments are formed.

It will be appreciated from the foregoing description that the invention provides novel electrostatic copiers that utilize novel multiple lenslet imaging objectives. While the objectives have been described as preferably formed of an acrylic plastic, they can be formed of other optical elements, including glass. However, plastic results in a suitable lens structure that is subject to easy and inexpensive mass production. Moreover, the lenslets can be adjacently formed or separated, as desired. In addition to the novel multiple lenslet imaging objective, the invention also provides a novel electrostatic copier that has a low silhouette and is versatile in that it can be used to copy a single document or a page of a book.

It will be appreciated by those skilled in the art and others that while the imaging objective herein described can be used in the described electrostatic copier, it can also be utilized in other copiers using imaging lens systems. Moreover, while the copy paper has been illustrated and described as being in "sheet" form, it can also be in roll form and cut to length as desired. Hence, not only can the imaging objective be formed of other materials than those herein described, but it can also be utilized in other environments.

The embodiments of the invention in which an exclusive property or privilege is claimed are defined as follows:

1. A multiple lenslet copier comprising:
copy storage means for storing copy paper;
stationary support means for supporting a document to be copied;
transport means for transporting copy paper from said copy paper storage means, said transport means comprising a belt driven by a plurality of pulleys, said belt being normally located beneath said copy paper storage means and movable beneath said stationary support means;
optical means mounted in close proximity to said support means for projecting a slit image of a portion of said document to be copied, said optical means including a multiple lenslet optical objective comprising a plurality of pairs of lenslets;
movement means for moving said transport means and said optical means with respect to said stationary support means, said transport means moving said copy paper as said movement means moves said optical means and said transport means so as to image succeeding slit images of said document onto said copy paper whereby a composite image of said document is formed on said copy paper;
an electrostatic charging area located above said belt for electrostatically charging the copy paper moved by said belt; and,
a developing region located beneath said belt for developing an image formed on said copy paper by said optical means.

2. A multiple lenslet copier as claimed in claim 1 including stripping means for stripping the sheet of copy paper from said belt after said sheet of copy paper has been developed by said developing means.

3. A multiple lenslet copier as claimed in claim 2 wherein said optical means also includes an illumination means for illuminating the slit image of said part of said document projected by said optical means.

4. A multiple lenslet copier as claimed in claim 3 wherein said plurality of pairs of lenslets have spherical optical surfaces and are arrayed along a common axis, each pair of lenslets comprising first and second lenslets separated by a narrow air gap, the adjacent optical surfaces of said first and second lenslets and said narrow gap forming a field lens for imaging light from the outer surface of said first lenslet to the outer surface of said second lenslet.

5. A multiple lenslet copier as claimed in claim 4 wherein said plurality of pairs of lenslets are mounted at right angles to one another so as to define an optical axis for each of said pairs of lenslets and including:
an optical stop located between each of said pairs of lenslets;
a mirror located at each of said optical stops for redirecting said projected image from one lenslet through the other lenslet of each of said plurality of pairs of lenslets; and,
a baffle located along each optical axis defined by a pair of lenslets.

6. A multiple lenslet copier as claimed in claim 5 wherein all of said first lenslets are formed of acrylic plastic as a first unitary structure and wherein all of said second lenslets are formed of acrylic plastic as a second unitary structure.

7. A multiple lenslet copier as claimed in claim 6 wherein said lenslets are separated from one another by a predetermined distance.

8. A multiple lenslet copier comprising:
copy paper storage means for storing copy paper;
transport means for transporting copy from said copy paper storage means;
support means for supporting a document to be copied;
optical means mounted in close proximity to said support means for projecting a slit image of a portion of said document to be copied, said optical means including a multiple lenslet objective comprising a plurality of pairs of lenslets, each lenslet being formed of a uniform material having a refractive index different than the refractive index of air and having two spherical optical surfaces, all of the optical surfaces of each pair of lenslets being arrayed along a common axis so that one of said pherical optical surfaces of one of said pair of lenslets is separated from one of said spherical optical surfaces of the other of said pair of lenslets by a narrow air gap, the narrowly separated spherical optical surfaces and said narrow air gap forming a field lens for imaging light from the outer spherical optical surface of one of said lenslets to the outer spherical optical surface of the other of said lenslets, said optical means also including an illumination means for illuminating the slit image of the portion of said document projected by said optical means; and,
movement means for moving at least one of said transport means, said support means, and said optical means with respect to said other of said means so as to image succeeding slit images of said document onto said copy paper whereby a composite image of said document is formed on said copy paper.

9. A multiple lenslet copier as claimed in claim 8 wherein said plurality of pairs of lenslets are mounted at right angles to one another so as to define an optical axis for each of said pairs of lenslets and including:
an optical stop located between each of said pair of lenslets;
a mirror located at each of said optical stops for redirecting said projected image from one lenslet through the other lenslet of each of said plurality of pairs of lenslets; and,
a baffle located along each optical axis defined by a pair of lenslets.

10. A multiple lenslet copier as claimed in claim 9 wherein all of said first lenslets are formed of acrylic plastic as a first unitary structure and wherein all of said second lenslets are formed of acrylic plastic as a second unitary structure.

11. A multiple lenslet copier as claimed in claim 10 wherein said lenslets are separated from one another by a predetermined distance.

12. A multiple lenslet copier as claimed in claim 8 wherein each lenslet of said plurality of pairs of lenslets has the same dimensions and spherical curvatures, each lenslet of said pairs of lenslets having two optical surfaces aligned along an optical axis; and, further including a mask having apertures, said mask being mounted in the narrow gap between said lenslets with one of said apertures being aligned along each of the optical axes defined by said plurality of pairs of lenslets.

13. A multiple lenslet copier as claimed in claim 12 wherein said mask is Z-shaped in cross section and said lenslets are generally T-shaped with the legs of the T's facing one another, said optical surfaces projecting outwardly from the tops of the T's and from the legs of the T's; and further including bands mounted between the arms of said T's for maintaining said lenslets and said mask in predetermined positions.

14. A multiple lenslet copier as claimed in claim 13 wherein said first and second lenslets of said plurality of lenslets are each formed as unitary structures of acrylic plastic.

15. A multiple lenslet copier as claimed in claim 14 wherein said lenslets are separated from one another along said common axis by a predetermined distance.

16. A multiple lenslet copier as claimed in claim 15 including a baffle located along each optical axis defined by a pair of lenslets.

17. A multiple lenslet copier as claimed in claim 16 including a Dove prism located along each optical axis defined by a pair of lenslets.

18. A multiple lenslet copier as claimed in claim 16 including a reflecting means located along each optical axis defined by a pair of lenslets.

19. A multiple lenslet copier comprising:
copy paper storage means for storing copy paper;
support means for supporting a document to be copied;
transport means for transporting inverted copy paper to a position beneath said support means, said transport means comprising: a paper feed roller for feeding copy paper from said copy paper storage means; a pair of pickup rollers for picking up and moving said copy paper after it is fed by said paper feed roller; a belt driven by pulleys for receiving copy paper from said pair of pickup rollers and moving said copy paper to said position beneath said support means; and, a curved track for directing said copy paper from said pair of pickup rollers to said belt;
optical means mounted in close proximity to said support means for projecting a slit image of a portion of said document to be copied, said optical means including a multiple lenslet optical objective comprising a plurality of pairs of lenslets; and,
moving means for moving said optical means with respect to said support means and said transport means so as to image succeeding slit images of said document onto said copy paper whereby a composite of said document is formed on said copy paper.

20. A multiple lenslet copier as claimed in claim 19 including:
an electrostatic charging area located at one end of said belt between said belt and said curved track for placing an electrostatic charge on said copy paper as said copy paper passes from said curved track to said belt;
an electrostatic developing region located at the other end of said belt for developing said copy paper after an image has been formed thereon by said optical means; and,
said transport means further including a pair of ejection rollers located on the other side of said developing region from said belt for ejecting said copy paper after it has been developed.

21. A multiple lenslet copier as claimed in claim 20 wherein said optical means includes an illumination means for illuminating the slit image of said part of said document projected by said optical means.

22. A multiple lenslet copier as claimed in claim 21 wherein said illuminating means comprises a pair of tubular lamps, each lamp being surrounded by a light directing housing, one of said lamps and housings being located on one side of said plurality of multiple lenslets and the other lamp and housing being located on the other side.

23. A multiple lenslet copier as claimed in claim 22 wherein said plurality of pairs of lenslets have spherical optical surfaces and are arrayed along a common axis, each pair of lenslets comprising first and second lenslets separated by a narrow air gap, the adjacent optical surfaces of said first and second lenslets and said narrow gap forming a field lens for imaging light from the outer surface of said first lenslet to the outer surface of said second lenslet.

24. A multiple lenslet copier as claimed in claim 23 wherein each lenslet of said plurality of pairs of lenslets has the same dimensions and spherical curvatures, each lenslet of said pairs of lenslets having two optical surfaces aligned along an optical axis; and, further including a mask having apertures, said mask being mounted in the narrow gap between said lenslets with one of said apertures being aligned along each of the optical axes defined by said plurality of pairs of lenslets.

25. A multiple lenslet copier as claimed in claim 24 wherein said mask is Z-shaped in cross section and said lenslets are generally T-shaped with the legs of the T's facing one another, said optical surfaces projecting outwardly from the tops of the T's and from the legs of the T's; and further including bands mounted between the arms of said T's for maintaining said lenslets and said mask in predetermined positions.

26. A multiple lenslet copier as claimed in claim 25 wherein said first and second lenslets of said plurality of lenslets are each formed as unitary structures of acrylic plastic.

27. A multiple lenslet copier as claimed in claim 26 wherein said lenslets are separated from one another along said common axis by a predetermined distance.

28. A multiple lenslet copier as claimed in claim 27 including a baffle located along each optical axis defined by said pairs of lenslets.

29. A strip lens optical objective comprising a plurality of pairs of adjacent lenslet, each lenslet being formed of a uniform optical material having a refractive index different than the refractive index of air, each pair of lenslets defining a common optical axis, the common optical axes defined by the pairs of lenslets being parallel, each pair of lenslets comprising first and second lenslets having first and second spherical optical surfaces designated I and II for said first lenslet and III and IV for said second lenslet, the surfaces II and III of said first and second lenslets being separated by a narrow air gap, surfaces II and III of said first and second lenslets and said narrow air gap forming a field lens for imaging light from surface I of said first lenslet to surface IV of said second lenslet.

30. An optical objective as claimed in claim 29 including an optical stop located in the narrow air gap between each pair of lenslets for limiting the size of the image projected by each pair of lenslets.

31. An optical objective as claimed in claim 30 wherein said pairs of lenslets are mounted at right angles to one another and including a mirror located at said optical stop between said pairs of lenslets for redirecting the image projected by each pair of lenslets.

32. An optical objective as claimed in claim 31 wherein all of said first lenslets are formed of acrylic plastic as a first unitary structure and wherein all of said second lenslets are formed of acrylic plastic as a second unitary structure.

33. An optical objective as claimed in claim 32 wherein said pairs of lenslets are separated along said common axis by a predetermined distance.

34. An optical objective as claimed in claim 33 wherein the outer ends of said pairs of lenslets are undercut and the inner ends are cut in a generally triangular cross-sectional configuration.

35. An optical objective as claimed in claim 34 including a baffle located along each optical axis defined by a pair of lenslets.

36. An optical objective as claimed in claim 30 wherein said optical stop is formed in a generally Z-shaped mask mounted between said pairs of lenslets.

37. An optical objective as claimed in claim 36 wherein said plurality of lenslets are formed in two generally T-shaped acrylic plastic structures, each of said structures including one of said pairs of lenslets.

38. An optical objective as claimed in claim 37 wherein the legs of the T-shaped structures face one another, the optical surfaces of the said T-shaped structures projecting outwardly from the bottom of the legs of the T-shaped structures and from the top of the T-shaped structures along an optical axis.

39. An optical objective as claimed in claim 38 including bands mounted between the arms of said T-shaped structures so as to hold said structures in a fixed, spaced relationship whereby said narrow air gap is provided between the inner optical surfaces of said pairs of lenslets.

40. An optical objective as claimed in claim 39 wherein said pairs of lenslets are separated along said common axis by a predetermined distance.

41. An optical objective as claimed in claim 40 including a baffle located along each optical axis defined by a pair of lenslets.

42. An optical objective as claimed in claim 41 including a Dove prism located along each optical axis defined by a pair of lenslets.

43. An optical objective as claimed in claim 41 including a reflecting means located along each optical axis defined by a pair of lenslets.

44. An optical objective as claimed in claim 29 including a baffle located along each optical axis defined by a pair of lenslets.

45. An optical objective as claimed in claim 44 including a Dove prism located along each optical axis defined by a pair of lenslets.

46. An optical objective as claimed in claim 44 including a reflecting means located along each optical axis defined by a pair of lenslets.

* * * * *

PO-1050
(5/69)

UNITED STATES PATENT OFFICE
CERTIFICATE OF CORRECTION

Patent No. 3,694,076    Dated September 26, 1972

Inventor(s) Paul E. Weber

It is certified that error appears in the above-identified patent and that said Letters Patent are hereby corrected as shown below:

Assignee:   Bell and Howell Company
            Chicago, Illinois

Signed and sealed this 20th day of February 1973.

(SEAL)
Attest:

EDWARD M.FLETCHER,JR.              ROBERT GOTTSCHALK
Attesting Officer                  Commissioner of Patents